(12) United States Patent
Chu

(10) Patent No.: US 7,324,265 B2
(45) Date of Patent: Jan. 29, 2008

(54) TUNING A NARROW BAND FILTER FOR TELECOMMUNICATION APPLICATIONS WITH AN ACOUSTIC OPTICAL TUNABLE FILTER

(75) Inventor: Raymond R. Chu, Cupertino, CA (US)

(73) Assignee: NeoPhotonics, Inc., San Jose, CA (US)

( * ) Notice: Subject to any disclaimer, the term of this patent is extended or adjusted under 35 U.S.C. 154(b) by 0 days.

(21) Appl. No.: 11/208,109

(22) Filed: Aug. 20, 2005

(65) Prior Publication Data
US 2006/0061852 A1     Mar. 23, 2006

Related U.S. Application Data

(63) Continuation-in-part of application No. 10/744,987, filed on Dec. 23, 2003, now Pat. No. 7,057,799, which is a continuation-in-part of application No. 10/428,899, filed on May 3, 2003, now Pat. No. 6,930,819.

(51) Int. Cl.
*G02F 1/33*     (2006.01)
*G02F 1/11*     (2006.01)

(52) U.S. Cl. ................................ 359/308; 359/285

(58) Field of Classification Search ........ 359/285–287, 359/305, 308
See application file for complete search history.

(56) References Cited

U.S. PATENT DOCUMENTS 3,817,598 A * 6/1974 Taylor .................... 359/308
4,028,636 A * 6/1977 Hughes ................... 372/20

* cited by examiner

*Primary Examiner*—Ricky Mack
*Assistant Examiner*—William C Choi
(74) *Attorney, Agent, or Firm*—Morrison Ulman

(57) ABSTRACT

An optical tunable filter that includes an tunable acousto-opto deflector (AOD) for deflecting a broad band beam to an expander for projecting the broad band beam to a set of grating for generated a tuned output beam corresponding to a deflection from the AOD and a wavelength resolution of the set of gratings. The AOD further includes an RF driver for tuning the AOD with an RF driving signal. The AOD further comprises a directional tuning acousto-optic crystal. The optical beam expander further includes a first and a second beam expanding prisms that composed of a material suitable for a dense wavelength division multiplexing (DWDM) application over a wavelength range covering S, C and L bands.

18 Claims, 2 Drawing Sheets

TUNING A NARROW BAND FILTER FOR TELECOMMUNICATION APPLICATIONS WITH AN ACOUSTIC OPTICAL TUNABLE FILTER

This is a Continuous-In-Part (CIP) Application of a previously filed application with Ser. No. 10/744,987 filed on Dec. 23, 2003 now U.S. Pat. No. 7,057,799, application Ser. No. 10/744,987 is a Continuation-In-Part application of Ser. No. 10/428,899 filed on May 3, 2003 now U.S. Pat. No. 6,930,819, by one of the Applicants of this invention. Application Ser. Nos. 10/428,899 and 10/744,987 are hereby incorporated by reference in this Patent Application.

FIELD OF THE INVENTION

The present invention relates generally to apparatuses and method for providing filters for optical fiber telecommunication systems. More particularly, this invention relates to new configurations and methods for providing tunable narrow band filters implemented with acoustic optical tunable deflector (AOD) with a beam expander to project an expanded beam to a set of diffraction gratings with dense resolution to satisfy highly demanding specifications for a tunable filter for practical implementation in a dense wavelength division multiplexing (DWDM) telecommunication system.

BACKGROUND OF THE INVENTION

Conventional technologies for designing and manufacturing tunable filters for telecommunication systems implemented with fiber optics are still faced with significant technical challenges. Specifically, in the field of fiber optics communications implemented with dense wavelength division multiplexing (DWDM) for transmitting optical signals in multiple channels in the optic fibers, the tunable filter is one of the most important components. In order to achieve high performance low cost and space savings with miniaturized components, a tunable filter is required to satisfy very demanding specifications. Under most circumstances for a DWDM system, a tunable filter is required to have low insertion loss, narrow bandwidth, flat passband, large tuning range, fast tuning speed, compact size and low driving power. In order to satisfy these very demanding requirements, only thin film filters are currently implemented with fixed filtering wavelength. Due to the technical difficulties in meeting these highly demanding system requirements, implementations of tunable filters are still not achievable in most cases even that a tunable filter can provide significant advantages of more operational flexibility, simplified system configurations and significant cost savings. Even with these technical challenges, there is still a great demand to provide a tunable filter to overcome these difficulties because the tunable filter is a critical component in the dynamically configurable routers, optical channel monitoring, and tunable lasers.

In the recent past, developments of the tunable filters to offer such performances have been focused mostly on acousto-optical tunable filter. Also, there are efforts to develop mechanical tunable filters by applying motor or micro electromechanical switch (MEMS), and liquid crystal (LD) based tunable filters. Additional efforts are also devoted to individual AO tunable filters, individual LD tunable filters and diffraction grating tunable filters with mechanical tuning.

Generally, an acousto-optic tunable filter (AOTF) has advantages of fast tuning speed, large tuning range. There were attempts to improve the performance of AOTF to provide narrower spectral bandwidth. However, narrower bandwidth often is achieved in the expense of large device size, high electrical power consumption and complexities of internal structure, thus raise cost and reliability concern and limits its practical applications in the telecommunication systems.

On the other hand, a diffractive grating has advantage of low insertion loss, narrow bandwidth, and excellent thermal stability. Different wavelength tuning mechanisms have been implemented in the incident beam port and mostly by means of thermal and mechanical tuning. Thermal tuning is slow and can provide only limited tuning range due to its impractical temperature elevation. Thermal tuning also limits the tuning resolution. Mechanical tuning is very sensitive to shock and vibration and is a very unstable method for telecom applications.

A fixed diffraction grating combined with an electrically tuned beam-directing device will ideally take advantages of both tuning mechanisms. In one of the methods U.S. Pat. No. 5,946,128, it describes a tunable filter with an AO deflecting filter and a diffraction grating. However, its AO deflecting filter is essentially a non-collinear AOTF. The acousto-optical filter only filters a selective band of wavelengths and therefore requires a large beam aperture into the AOTF. It then relies on the diffraction grating to further separates the incoming wavelengths to multiple ports. For very narrow band optical power monitoring applications where filter bandwidth is <0.1 nm and still smaller preferred, the requirements for the AO crystal is in the order of 20 mm cubes and will consume watts of electrical power along with large size making it very impractical for telecom applications. In addition, the filter shape is typically SINC-like having none-flat pass-band inducing distortions in DWDM signal filtering.

FIG. 1 illustrates a conventional device that combines a diffraction grating and an acousto-optic beam deflector to form a so-called grating assisted acousto-optic tunable filter. This device claims to have narrow bandwidth for selected wavelengths, down to 0.13 nm, while maintaining the rapid tenability of ~10 microseconds. A tuning range of up to 52 nm is achieved to cover the EDFA working range around 1550 nm. However, the device has following limitations.

1. In order to have a high spectral resolution from the diffraction grating, the collimated beam from lens 2, going through acousto-optic beam deflector 3, to the grating 4, needs to be large. For example, in the U.S. Pat. No. 5,946,128, a 6-mm diameter beam results in a 0.2-nm spectral bandwidth. A further increase in spectral resolution would require even larger beam size. However, a large beam size on AOTF demands a large size of the acousto-optic material, which puts serious limitations on practical applications: high RF power to drive the crystal and then high cooling capacity needed; large crystal volume leading to high cost of manufacturing and unfit to limited space in telecom applications.

2. Since the diffraction grating determines the spectral bandwidth, the filter spectral shape is essentially proportional to $$\left\{ \frac{\sin(N\pi d\sin\varphi/\lambda)}{\sin(\pi d\sin\varphi/\lambda)} \right\}^2, \quad (1)$$

where N is the total number of grooves of the grating, d is the grating constant, and φ is the diffraction angle. This none-flat passband is not preferred in DWDM applications.

3. The tuning speed is related to the beam size on the acousto-optic beam deflector. In order to keep tuning time at less than 10 microseconds, the aperture of acousto-optic beam deflector 3 needs to be 6 mm or less. On the other hand, the high spectral resolution from the diffraction grating requires a large beam size on the grating. Therefore, there is an inherent trade-off between tuning speed and spectral resolution in the prior art design.

4. Wavelength tuning range limitation is related to RF tuning range and can become very limiting in practical implementations.

For these reasons, there is still a need in the art to provide an improved design and manufacture process to provide a high resolution narrow linewidth tunable filter tunable with low power consumptions and suitable for assembled into a small package for practical applications in a typical telecommunication systems implemented with DWDM technologies. It is desirable that the new and improved tunable filter can be produced with high level of optical performance characteristics and low cost.

SUMMARY OF THE PRESENT INVENTION

It is therefore an object of the present invention to provide a compact, very high resolution (narrow linewidth) and low power consumption tunable filter suitable for telecom DWDM applications and practically for very high-resolution spectroscopic applications such that the above discussed difficulties and limitations may be resolved.

Another aspect of this invention is to provide a narrow bandwidth, flat-top tunable filter that is fast tuning without moving parts and widely tuned to cover at least 40 nm and capable to tuning more then 100 nm to cover both C and L bands of the telecom optical bandwidth.

Another aspect of this invention is to provide a compact and cost effective tunable filter for dynamically configurable cross-connectors and add/drop modules in DWDM applications wherein the filtered channel is implemented as the drop channel. The tunable filter is further implemented as an add module when the optical transmission is projected in a reverse direction wherein the filtered channel is added to the optical transmission.

Another aspect of this invention is to provide a tunable filter with a small form factor to fit into tight space. Furthermore, a reduced production cost of such compact package makes it practical to manufacture in a large volume.

Another aspect of this invention is to provide a tunable filter to satisfy the demands of a fast wavelength tuning speed, low power consumption and wide wavelength tuning range. These requirements are satisfied by designing a highly effective acousto-opto beam deflector (AOD) device which capable to deflect small aperture beam (<500 um in diameter) whose only purpose is to deflect the light of practically all the wavelengths in a single direction simply by means of Bragg's diffraction. For a system provided with an AOD with a small aperture, the output beam from the AOD is essentially the same as the incident beam. The deflected angle is determined and tuned by the frequency of RF signal driving acoustic wave in the crystal. The narrow spectral bandwidth of selected DWDM channel is achieved by a combination of a beam expander and a set of fixed diffraction gratings, preferred Littrow-type, to have a high throughput (low insertion loss).

Another object is to provide a narrow spectral bandwidth tunable filter for precise channel performance monitoring and other related applications. Spectral resolution is improved by using a grazing-incidence grating, together a beam expander.

It is still another object of this invention for telecom DWDM applications to provide a flat-top and sharp stop band filter with high side-mode rejection (high channel isolation) through fixed telecom ITU grid spaces shaping filter.

In this invention, besides the advantages achieved by combining the acoustic-optic tuning and high dense diffraction gratings, the two key components to provide a high performance tunable filter for DWDM applications are the beam expander and the directional tuning acousto-optic crystal. The beam expander generates a large beam size on the grating, which results in a high spectral resolution, while it keeps the input beam in the acousto-optic crystal small. The optical system thus enables the use of a compact crystal and leads to low cost production. A patented acousto-optic crystal disclosed in a prior patent application by a common inventor of this Application is implemented in this invention to deflect a broad spectral band beam with minimal dispersion. Thus it acts solely as a beam-deflecting device, and the deflecting angle is a function of the frequency of RF driving signal only, independent of the optical frequency of the incident beam.

Briefly, in a preferred embodiment, the present invention discloses a tunable filter that includes an tunable acousto-opto deflector (AOD) for deflecting a broad band beam to an expander for projecting the broad band beam to a set of grating for generated a tuned output beam corresponding to a deflection from the AOD and a wavelength resolution of the set of gratings. The AOD further includes an RF driver for tuning the AOD with an RF driving signal. In a preferred embodiment, the AOD further comprising a directional tuning acousto-optic crystal. In a preferred embodiment, the optical beam expander further includes a first and a second beam expanding prisms. In a preferred embodiment, optical beam expander further composed of a material suitable for a dense wavelength division multiplexing (DWDM) application over a wavelength range covering S, C and L bands. In a preferred embodiment, tunable filter is applicable for tuning over a wavelength range of at least 100 nm covering S, C and L bands. In a preferred embodiment, AOD is provided for deflecting an optical beam of an aperture smaller than 500 microns in diameter. In a preferred embodiment, AOD is provided for deflecting an optical beam of an aperture smaller than 500 microns in diameter and generating an output beam of a substantially same aperture. In a preferred embodiment, set of gratings further comprises a set of fixed diffraction gratings.

In a preferred embodiment, this invention further discloses a method for tuning an optical signal. The method includes a step of deflecting a broadband beam from a tunable acousto-opto deflector (AOD) to an expander for projecting the broad band beam to a set of grating for generated a tuned output beam corresponding to a deflection from the AOD and a wavelength resolution of the set of gratings. In a preferred embodiment, the step of deflecting the broadband beam from the AOD further comprises tuning the AOD with an RF driving signal. In another preferred embodiment, the step of deflecting the broadband beam from the AOD further comprises employing a directional tuning acousto-optic crystal as the AOD to deflect the broadband beam. In another preferred embodiment, the step of projecting the optical beam from the expander to the set grating further comprises a step of employing a first and a second beam expanding prisms as the optical beam expander. In another preferred embodiment, the step of projecting the optical beam from the expander to the set grating further comprises a step of employing a material suitable for a dense wavelength division multiplexing (DWDM) application over a wavelength range covering S, C and L bands to form the optical beam expander. In another preferred embodiment, the method further includes a step of tuning a broadband optical signal over a wavelength range of at least 100 nm covering S, C and L bands. In another preferred embodiment, the step of deflecting the broadband beam from the AOD further comprises deflecting an optical beam of an aperture smaller than 500 microns in diameter. In another preferred embodiment, the step of deflecting the broadband beam from the AOD further comprises deflecting an optical beam of an aperture smaller than 500 microns in diameter and generating an output beam of a substantially same aperture. In another preferred embodiment, the method further includes a step of shaping an incoming optical beam by applying a periodic filtering grid coinciding with an ITU (International Telecommunication Union) grid and shaping the incoming beam with a transmission profile complimenting a transmission of the set of gratings.

These and other objects and advantages of the present invention will no doubt become obvious to those of ordinary skill in the art after having read the following detailed description of the preferred embodiment, which is illustrated in the various drawing figures.

DETAILED DESCRIPTION OF THE INVENTION

Figure 1:
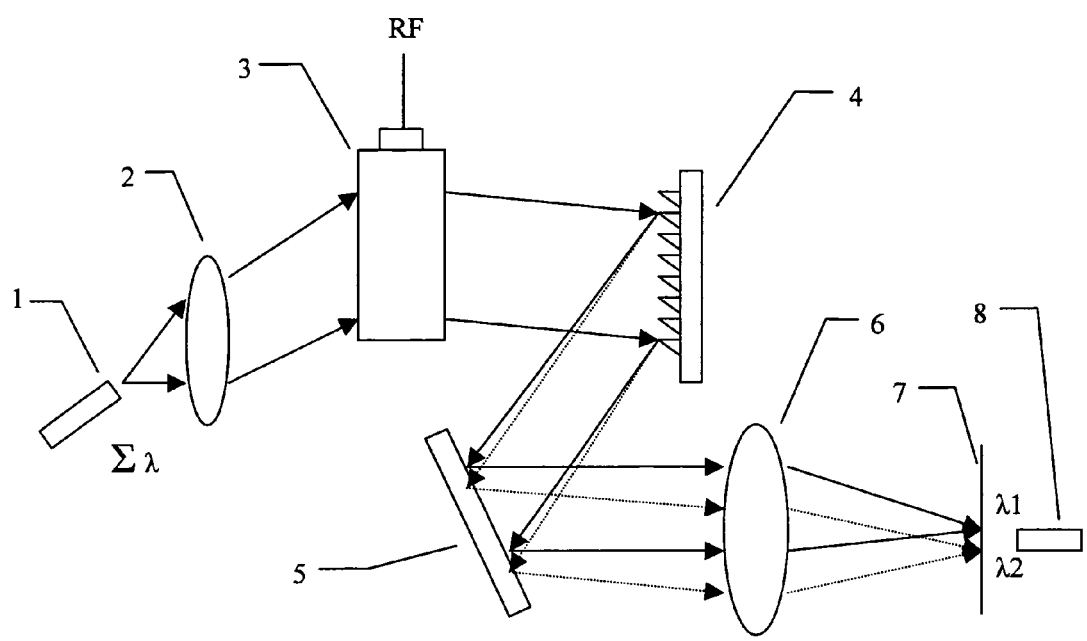
FIG. 1 schematically illustrates a prior art device.
Figure 2:
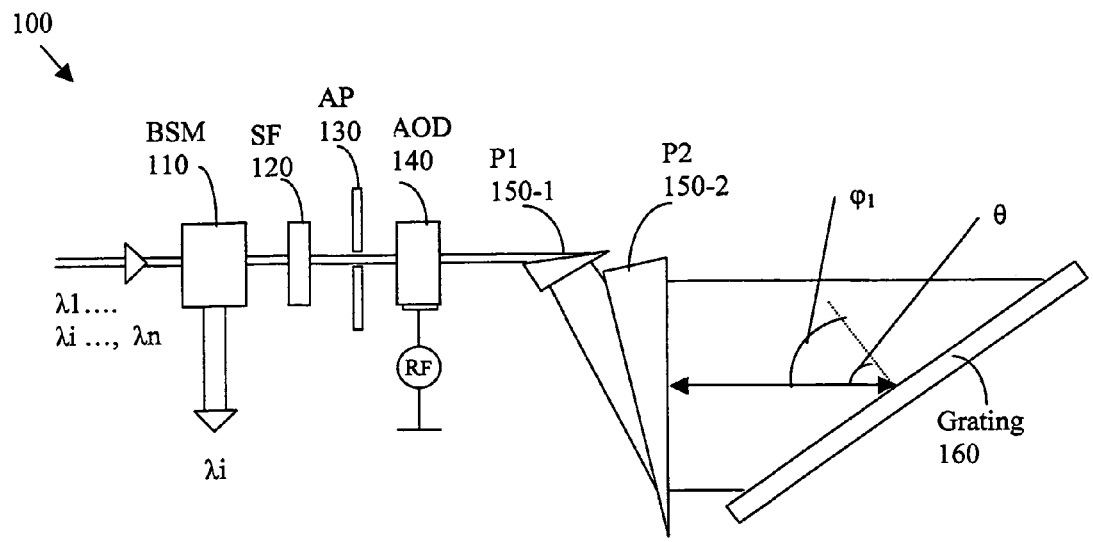
FIG. 2 schematically illustrates a first embodiment of the high resolution tunable filter according to the present invention.

FIG. 2 shows a functional block diagram for a tunable narrow band filter 100 of the present invention. The tunable filter 100 includes a beam separation polarization and handling module (BSM) 110 to receive a multiple channel optical signal comprising signals of wavelengths $\lambda 1$, $\lambda 2$, $\lambda 3$, ..., $\lambda n$. An optical signal $\lambda i$ is separated by the BSM and the signals of remainder channels pass through to project to a shaping filter (SF) 120. Depending on the different applications, the BSM module 110 can be a directional coupler, wavefront splitter, polarization splitter, circulator, or any combination of these devices plus other components. Its function can be drop, add, or drop and add of selected channels.

The SF 120 has a periodic filtering grid coincides and matches with the ITU (International Telecommunication Union) grid spacing to shape-match that of the grating filter as that will be discussed below for producing flat-top filtering profile. The filtered signals passing through the SF 120 is then projected onto an optical aperture (AP) 130 for carrying out a spatial cleaning function. The optical signal then projected onto an Acousto-opto deflector (AOD) 140. The AOD 140 comprises a directional tuning Acousto-optic crystal. The acousto-optic crystal in the AOD 140 is designed to deflect a broad spectral band beam with minimal dispersion. Thus the AOD 140 acts solely as a beam-deflecting device. The deflecting angle is a function of the frequency of RF driving signal only and is independent of the optical frequency of the incident beam. The deflected and directionally tuned beam then expanded by a beam expander 150 to project onto a grating 160. The beam expander 150 includes two beam-expanding prisms 150-1 and 150-2. The prisms 150-1 and 150-2 can be made of glasses, silicon, or any other suitable IR materials for DWDM applications in all S, C, L bands, or general applications for processing optical signals transmitted in wavelength ranges.

The tunable filter 100 takes advantage by combining the acoustic-optic tuning and a high density grating 160 to produce a high performance tunable filter. Essentially, two of the key components in this tunable filter are the beam expander 150 and the directional tuning acousto-crystal 140. The beam expander 150 significantly expands the beam, e.g., at least ten times greater than the beam projected to the acousto-optical deflector 140, to generate a large beam size to project on the grating 160. High spectral resolution is therefore achieved through this optical configuration. Meanwhile, the beam size of the optical signals projected to the acousto-optical crystal 140 can be maintain relative small so that cost savings can be achieved by using a smaller acousto-optical crystal 140 for acousto-optical tuning. A small acousto-optical crystal also provides the advantages of low RF power consumption and achieves high tuning speed. The acousto-optical crystal 140 implemented, as an AOD may be an acousto-optical crystal as that disclosed in U.S. Pat. No. 6,822,785, and the disclosures in that Patent is hereby incorporated by reference. The acousto-optical crystal 140 is implemented in this invention to deflect a broad spectral band beam with minimum dispersions and functions solely as a beam-deflecting device. The light deflected from AOD 140 practically includes all the wavelengths in a single direction simply by means of Bragg's diffraction. The output beam size from the AOD 140 is essentially the same as the incident beam size. It is designed to deflect small aperture beam, with high efficiency, and large tuning angle. The deflecting angle is a function of the frequency of an RF driving signal and independent of the optical signal frequency.

The acousto-optic crystal of the AOD 140 is designed for large angle deflection applications where its main function is beam steering. The performance requirements for such an AO deflector (AOD) are (1) large deflection angle; (2) broad pass band, it essentially pass all the wavelength of the light source, deflects a broad spectral band beam with no color dispersion. (3) Deflected beam has similar shape as the incident beam. In a preferred embodiment, the acousto-optical crystal of the implemented in the AOD 140 is a small crystal with a dimension of about 4 mm×3 mm×4 mm and the AOD 140 consumes little RF power.

Figure 3:
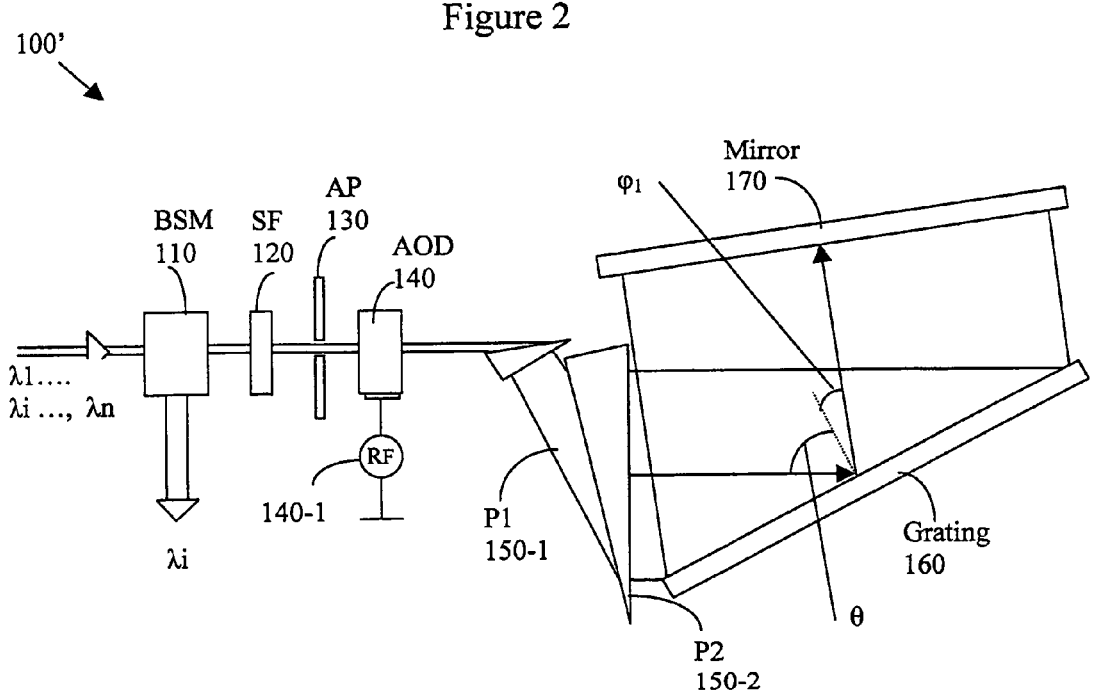
FIG. 3 schematically illustrates a second embodiment of the high resolution tunable filter according to the present invention.

In the AOD 140, the configuration of acousto-optical deflection is typically non-collinear as the optical beam propagates none-parallel in the AOD 140 and in fact almost perpendicular, to the acoustic wave. The acoustic wave is propagating in shear mode and a few degrees off the [110] axis. This is to ensure the condition of Braggs phase matching of the acousto-optical interaction is satisfied for the broad wavelength and also to ensure during deflection tuning with RF frequency, the incident angle of the light remains substantially unchanged while the exit beam is deflected substantially linear to the RF frequency applied to the acousto-optical crystal in the AOD 140. In a preferred embodiment designed for an actually operational AO tunable filter, an AOD is implemented that has about 4 mm×4 mm×4 mm in size, around 80 Mhz of operating frequency with +/−10 Mhz tuning bandwidth and the deflection angle is >4 degrees. Thus the spectral or wavelength resolution of this invention is determined by the diffraction grating resolution. A grating dispersion is described by $$m\lambda = d(\sin\theta + \sin\phi_m). \quad (2)$$

Where m is the diffraction order, d is the grating spacing, θ is the incident angle, $\phi_m$ is the diffraction angle of $m^{th}$ order, and λ is the wavelength. FIGS. 2 and 3 are two preferred configurations of this invention for arranging the gratings 160 in retro-reflecting mounting geometries. In FIG. 2, the diffraction grating is mounted in Littrow configuration. In this configuration the incident angle and diffraction angle are equal:

$$\theta = \phi_m. \quad (3)$$

The grating wavelength resolution δλ is determined by the resolving power $$R = \frac{\lambda}{\delta\lambda} = mN, \quad (4)$$

$$N = 2\omega d, \quad (5)$$

where N is the number of grating periods within the beam size and ω is the radius of the beam on grating surface. With a Littrow grating configuration, at 1.55-micron wavelength, d=1200/mm, the first order wavelength resolution δλ is ~0.086 nm for an incident beam of 15-mm diameter.

For most applications in telecom field, the incident light is usually a Gaussian beam. A custom designed prism beam expander with transverse magnification M=15 would have a beam size of 1-mm diameter in AOD and result in a wavelength resolution δλ=0.086 nm.

In FIG. 3 the grating 160 is mounted in grazing-incidence configuration. This incident beam makes two passes at grating 160, resulting in a better angular dispersion. The wavelength resolution is essentially same as that for FIG. 2.

For the purpose of improving the optical signal transmission performance, the shaping filter (SF) 120 is implemented. In actual telecommunication systems implemented with DWDM signal transmissions, the required wavelengths are usually on a set of fixed values, so-called ITU grid. Hence a tunable filter may only need to be tuned to these fixed wavelengths, commonly known as signal channels, or in some cases, to the wavelengths with a fixed off-set from the ITU grid. Thus adding a fixed filter 120 with a periodic modulation profile and with the period and its passband peak positions the same as those of the desired ITU grid does not interfere the function of the tunable filter and in the meantime improve the performance of the filter. One of the advantages this spectral periodic modulation brings is that it can improve the filtering of the background level between the ITU channels. Furthermore, the shaping filter 120 provides another advantage that the spectral profile of the tunable filter 100 is improved. The shaping filter 120 has a periodic transmission profile with its period matching that of desired ITU grid spacing, and a transmission profile that complements the spectral shape of the diffraction grating 160. A combined spectral profile of shaping filter 120 and grating 160 is a flattop with sharp edges, centered on the desired wavelengths. The SINC-like spectral shape of diffraction grating described by equation (1) is not desired in DWDM applications. The combined waveform having a square-shape filtering profile and steep edges causes minimal distortions to the channel pulses. Therefore, the output optical waveform generated is an ideal signal generated from the tunable filter 100 for DWDM applications.

According to above descriptions, the tunable filter of this invention includes an AOD and the AOD further includes a directional tuning acousto-optic crystal having a size approximately 4 mm×3 mm×4 mm or a size smaller than 10 mm×5 mm×5 mm. In a preferred embodiment, the AOD is operated around a frequency of 80 Mhz with a +/−10 Mhz tuning bandwidth and a deflection angle about +/−2 degrees that may be greater than four degrees. In a specific embodiment, the set of gratings is mounted in a Littrow configuration with a beam incident angle from the optical beam expander equal to a diffraction angle. In a preferred embodiment, the set of gratings having a wavelength resolution ranging from 0.25 to 0.05 nanometers for a mounted in a Littrow configuration with an incident beam from the optical beam expander having a beam aperture ranging from 5 mm to 25 mm. In a preferred embodiment, the set of gratings is mounted in a grazing-incidence configuration for directing an incident beam from the optical beam expander to pass the set of gratings twice for reducing an angular dispersion. In a preferred embodiment, the tunable filter further includes an aperture for projecting an incident beam to the AOD with a predefined beam aperture. In a preferred embodiment, the tunable filter further includes a beam separation and handling module to receive and to separate a portion of a multi-channel optical signal to project to the AOD. In a preferred embodiment, the tunable filter further includes a beam separation and handling module to receive and to drop a portion of a multi-channel optical signal for projecting to the AOD.

In summary, the wavelength tuning of this invention, which is achieved by tuning the frequency of the RF signal on the AOD, has following advantages: low insertion loss due to the high efficient AOD and grating; narrow bandwidth due to the combination of beam expander and diffraction grating; large tuning range due to the custom design of AOD; fast tuning speed of acousto-optical mechanism; and compact size and low driving power of AOD due to the small beam size in AOD.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A tunable filter comprising:
    a tunable acousto-opto deflector (AOD) for deflecting a broad band beam to an expander for projecting said broad band beam to a set of gratings for generating a tuned output beam corresponding to a deflection from said AOD and a wavelength resolution of said set of gratings; and wherein said AOD further comprises an RF driver for tuning said AOD with an RF driving signal; and wherein said expander further comprises a first and a second beam expanding prisms.

2. A tunable filter comprising:
    a tunable acousto-opto deflector (AOD) for deflecting a broad band beam to an expander for projecting said broad band beam to a set of gratings for generating a tuned output beam corresponding to a deflection from said AOD and a wavelength resolution of said set of gratings; and wherein said AOD further comprises an RF driver for tuning said AOD with an RF driving signal; and further comprising: a shaping filter comprising a periodic filtering grid coinciding with an ITU grid or with a certain offset to ITU grid.

3. The tunable filter of claim 2 wherein said shaping filter has a transmission profile complimenting a transmission of said set of gratings.

4. A tunable filter comprising:
a tunable acousto-opto deflector (AOD) for deflecting a broad band beam to an expander for projecting said broad band beam to a set of gratings for generating a tuned output beam corresponding to a deflection from said AOD and a wavelength resolution of said set of gratings; and wherein said AOD further comprises an RF driver for tuning said AOD with an RF driving signal; and wherein said set of gratings have a wavelength resolution ranging from 0.25 to 0.05 nanometers with an incident beam from said expander having a beam aperture ranging from 5 mm to 25 mm.

5. A tunable filter comprising:
a tunable acousto-opto deflector (AOD) for deflecting a broad band beam to an expander for projecting said broad band beam to a set of gratings for generating a tuned output beam corresponding to a deflection from said AOD and a wavelength resolution of said set of gratings; and wherein said AOD further comprises an RF driver for tuning said AOD with an RF driving signal; and wherein said set of gratings is mounted in a grazing-incidence configuration for directing an incident beam from said expander to pass said set of gratings twice for reducing an angular dispersion.

6. A tunable filter comprising:
a tunable acousto-opto deflector (AOD) for deflecting a broad band beam to an expander for projecting said broad band beam to a set of gratings for generating a tuned output beam corresponding to a deflection from said AOD and a wavelength resolution of said set of gratings; and wherein said AOD further comprises an RF driver for tuning said AOD with an RF driving signal; and further comprising a beam separation and handling module to receive and to separate a portion of a multi-channel optical signal to project to said AOD.

7. A tunable filter comprising:
a tunable acousto-opto deflector (AOD) for deflecting a broad band beam to an expander for projecting said broad band beam to a set of gratings for generating a tuned output beam corresponding to a deflection from said AOD and a wavelength resolution of said set of gratings; and wherein said AOD further comprises an RF driver for tuning said AOD with an RF driving signal; and further comprising a beam separation and handling module to receive and to drop a portion of a multi-channel optical signal for projecting to said AOD.

8. A tunable filter comprising:
a tunable acousto-opto deflector (AOD) for deflecting a broad band beam to an expander for projecting said broad band beam to a set of gratings for generating a tuned output beam corresponding to a deflection from said AOD and a wavelength resolution of said set of gratings; and wherein said AOD further comprises an RF driver for tuning said AOD with an RF driving signal; and further comprising a beam separation and handling module to receive and to add an optical signal to a multi-channel optical signal to project to said AOD.

9. A tunable filter comprising:
a tunable acousto-opto deflector (AOD) for deflecting a broad band beam to an expander for projecting said broad band beam to a set of gratings for generating a tuned output beam corresponding to a deflection from said AOD and a wavelength resolution of said set of gratings: and wherein said AOD further comprises an RF driver for tuning said AOD with an RF driving signal; and further comprising a beam separation and handling module to receive an input multi-channel optical signal and to function as a directional coupler.

10. A tunable filter comprising:
a tunable acousto-opto deflector (AOD) for deflecting a broad band beam to an expander for projecting said broad band beam to a set of gratings for generating a tuned output beam corresponding to a deflection from said AOD and a wavelength resolution of said set of gratings; and wherein said AOD further comprises an RF driver for tuning said AOD with an RF driving signal; and further comprising a beam separation and handling module to receive an input multi-channel optical signal and to function as a polarization splitter.

11. A tunable filter comprising:
a tunable acousto-opto deflector (AOD) for deflecting a broad band beam to an expander for projecting said broad band beam to a set of gratings for generating a tuned output beam corresponding to a deflection from said AOD and a wavelength resolution of said set of gratings; and wherein said AOD further comprises an RF driver for tuning said AOD with an RF driving signal; and further comprising a beam separation and handling module to receive an input multi-channel optical signal and to function as a wave front splitter.

12. A tunable filter comprising:
a tunable acousto-opto deflector (AOD) for deflecting a broad band beam to an expander for projecting said broad band beam to a set of gratings for generating a tuned output beam corresponding to a deflection from said AOD and a wavelength resolution of said set of gratings; and wherein said AOD further comprises an RF driver for tuning said AOD with an RF driving signal; and further comprising a beam separation and handling module to receive an input multi-channel optical signal and to function as an optical circulator.

13. A method for tuning an optical signal comprising:
deflecting a broadband beam from a tunable acousto-opto deflector (AOD) to an expander for projecting said broad band beam to a set of gratings for generating a tuned output beam corresponding to a deflection from said AOD and a wavelength resolution of said set of gratings, wherein said step of projecting said optical beam from said expander to said set of gratings further comprises a step of employing a first and a second beam expanding prisms as said optical beam expander.

14. A method for tuning an optical signal comprising:
deflecting a broadband beam from a tunable acousto-opto deflector (AOD) to an expander for projecting said broad band beam to a set of gratings for generating a tuned output beam corresponding to a deflection from said AOD and a wavelength resolution of said set of gratings; and tuning a broadband optical signal over a wavelength range of at least 100 nm covering S, C and L bands.

15. A method for tuning an optical signal comprising:
deflecting a broadband beam from a tunable acousto-opto deflector (AOD) to an expander for projecting said broad band beam to a set of gratings for generating a tuned output beam corresponding to a deflection from said AOD and a wavelength resolution of said set of gratings, wherein said step of deflecting said broadband beam from said AOD further comprises a step of deflecting an optical beam of an aperture smaller than 500 microns in diameter.

16. The method of claim 15 wherein:
said step of deflecting said broadband beam from said AOD further comprises a step of deflecting an optical beam of an aperture smaller than 500 microns in diameter and generating an output beam of a substantially same aperture.

17. A method for tuning an optical signal comprising:
deflecting a broadband beam from a tunable acousto-opto deflector (AOD) to an expander for projecting said broad band beam to a set of gratings for generating a tuned output beam corresponding to a deflection from said AOD and a wavelength resolution of said set of gratings; and further comprising shaping an incoming optical beam by applying a periodic filtering grid coinciding with an ITU grid or with a certain offset to ITU grid.

18. The method of claim 17 further comprising:
shaping said incoming beam with a transmission profile complimenting a transmission of said set of gratings.

* * * * *